United States Patent [19]

Taubert et al.

[11] Patent Number: 4,464,501

[45] Date of Patent: Aug. 7, 1984

[54] FLAMEPROOFING OF THERMOPLASTICS, THERMOSETTING POLYMERS, TEXTILES, AND OTHER FLAMMABLE MATERIALS WITH ANTIMONY OXY COMPOUNDS

[75] Inventors: Rainer Taubert, Cologne; Utto Kerscher, Erfstadt, both of Fed. Rep. of Germany

[73] Assignee: Chemische Fabrik Kalk GmbH, Cologne, Fed. Rep. of Germany

[21] Appl. No.: 296,664

[22] Filed: Aug. 27, 1981

[30] Foreign Application Priority Data

Aug. 27, 1980 [DE] Fed. Rep. of Germany ....... 3032192

[51] Int. Cl.³ .............................................. C08K 3/30
[52] U.S. Cl. ................... 524/410; 106/18.28
[58] Field of Search ................ 260/45.75 B, DIG. 24; 524/410, 411; 160/18.28

[56] References Cited

U.S. PATENT DOCUMENTS 3,970,638  7/1976  Dickens ........................ 260/45.75 B
4,125,368  5/1979  Dorfman et al. ............. 260/45.75 B

FOREIGN PATENT DOCUMENTS 627622  7/1963  Belgium .
1008994  11/1965  United Kingdom .

OTHER PUBLICATIONS

Journal of Cellular Plastics–Jan./Feb. 1970, 35–37, Pitts et al.
Halogenated Fire Suppressants–ACS Symposium Series 16, 1975, 118–48, Hastie et al.
CA 60 16059d Leebrick et al.
Pitts–"Antimony–Halogen Synergistic Reactions in Fire Retardants"–J. Fire & Flammability (1972) pp. 51 to 84.

*Primary Examiner*—V. P. Hoke
*Attorney, Agent, or Firm*—Millen & White

[57] ABSTRACT

Flameproofed thermoplastic synthetic resins, elastomeric synthetic resins, rubber-type synthetic resins, thermosetting synthetic resins, and elastomers have both halogen- and antimony-containing flameproofing components, the latter having the formula $Sb_4O_5X_y$, wherein X is chlorine, bromine, or sulfate and y is 2 or 1.

4 Claims, No Drawings

FLAMEPROOFING OF THERMOPLASTICS, THERMOSETTING POLYMERS, TEXTILES, AND OTHER FLAMMABLE MATERIALS WITH ANTIMONY OXY COMPOUNDS

BACKGROUND OF THE INVENTION

Chlorine, bromine, phosphorous, and nitrogen compounds are preferably employed for flameproofing thermoplastics, thermosetting polymers, textiles, and other flammable materials utilized in the construction field, for conveyances, electric appliances, and similar applications.

The effect of these flameproofing agents can in many cases be considerably enhanced by antimony trioxide. Frequently, satisfactory flameproofing can only be obtained with the use of such flameproofing agents in combination with antimony compounds.

According to more recent findings, additional antimony compounds have been recommended for this purpose, such as, for example, potassium antimony tartrate, antimony triphenyl, antimony phosphate, or ammonium hexafluorantimonate, but these compounds show a lower synergistic effect as compared with antimony trioxide. Besides, these compounds can usually be manufactured only with difficulty and considerable technical expenditure.

SUMMARY OF THE INVENTION

Thus, it is an object of the present invention to provide a flameproofing formulation ensuring adequate fireproofing, which formulation does not impair, in conjunction with the aforementioned organic flameproofing agents, the physical properties of the thermoplastics, thermosetting polymers, and/or textiles and other flammable synthetic resins into which it is incorporated.

Upon further study of the specification and appended claims, further objects and advantages of this invention will become apparent to those skilled in the art.

These objects have been achieved by the present invention, by providing flameproofed thermoplastic synthetic resins, elastomeric synthetic resins, rubber-like synthetic resins, thermosetting synthetic resins, and elastomers with a content of halogen- and antimony-containing flameproofing components. A characterizing feature of these synthetic resins is that they contain, as the antimony-containing flameproofing component, a compound of the general formula $Sb_4O_5X_y$ wherein X is a chlorine, bromine, or sulfate anion and y is 2 or 1, in amounts of 1–20% by weight, preferably 5–10% by weight based on the total weight of the composition.

DETAILED DISCUSSION

The aforementioned antimony compounds of the formula $Sb_4O_5X_y$, for example $Sb_4O_5Cl_2$, $Sb_4O_5Br_2$ or $Sb_4O_5SO_4$, can be produced according to "Gmelin", Handbuch der anorgan. Chemie [Handbook of Inorganic Chemistry] 18, Sb Volume (1949); 467 and 485, which is incorporated by reference herein, by heating of antimony (III) chloride or antimony (III) bromide, respectively, with water. These compounds are white powders only sparingly soluble in water and having high bulk densities and high refractive indices.

By using the halogen-containing antimony compounds of this invention for flameproofing purposes, the proportion of halogenated organic flameproofing agents, the primary flame inhibitors, can be substantially reduced. In most cases, one governing factor for attaining satisfactory flameproofing of the above-mentioned synthetic resins is the amount of halogen incorporated into the synthetic resin with the organic flameproofing agent. However, if the halogen is utilized with antimony as the halogen carrier, then the amount of conventional halogen-containing flameproofing agent to be employed can be reduced. The extent of this reduction is such that the quantities of halogen contained in the synthetic resin and consisting of organic halogen compound + antimony halide or antimony oxyhalide are each correspondingly decreased, without reduction of flameproofing effect. However, for this invention, even the total amount of halogen in both components is lessened, e.g., by 10–20 percent with respect to the otherwise total amount of halogen conventionally required. For this invention, the amount of conventional halogenated organic flameproofing agents is usually 5–12% by weight based on the total weight of the composition.

On the other hand, organic halogen compounds, especially in cooperation with antimony trioxide, do result in excellent flameproofing of most synthetic resin compositions, but the necessary quantity of the incorporated organic flameproofing compounds, which frequently is rather large, has in many cases disadvantageous effects on the physical properties of the synthetic resins into which they have been incorporated.

The polymers which can be flameproofed using this invention included all of those for which organic halogen compounds have been customarily used for flameproofing. These are many and are well known to those skilled in the art. For example a representative listing is disclosed in Vogel, "Flammfestmachen von Kuntsstoffen" Huethig Verlag, Heidelberg FRG (1966), which are incorporated by reference herein.

Equally conventional and well known to those skilled in the art are the organic halogen compound flameproofing agents referred to herein. Representative listings are disclosed in Vogel, "Flammfestmachen von Kuntsstoffen" Huethig Verlag, Heidelberg FRG (1966), which are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following tables show examples and characteristic values for the synthetic resins produced with the antimony oxy compounds of this invention, as compared with conventional formulations.

The specimens for flammability testing and determination of the physical properties of the individual synthetic resins are prepared as follows:

The granulated or pulverized synthetic resin is mixed with the corresponding flameproofing agents; this mixture is extruded by way of an extruder and injection-molded in an injection-molding machine to obtain the corresponding standard components.

The processing temperature corresponds to the working temperatures customary for the synthetic resin in the range from 200° to 270° C. The oxygen index is determined according to ASTM-D-2863-72. A portion of the specimens is tested according to DIN 4102. A test in accordance with Underwriters' Laboratories UL 94 is furthermore conducted.

The antimony oxyhalides according to this invention were incorporated into the following synthetic resins:
  A into high-impact-strength polystyrene (HIPS)
  B into acrylonitrile-butadiene-styrene polymer (ABS)
  C into polytetramethylene terephthalate (PTMT)
  D into polypropylene (PP)
  E into low-density polyethylene (LDPE)
  F into polyvinyl chloride (PVC)
  G into rubber
  H into unsaturated polyester resin (UP resin)
  I into polyurethane foam (PUR)

TABLE 1

|  | HIPS (A) | | | ABS (B) | | | PTMT (C) | PP (D) | | LDPE (E) | |
|---|---|---|---|---|---|---|---|---|---|---|---|
| Synthetic Resin | 81 | 82 | 82 | 81 | 82 | 84 | 86 | 94.5 | 95.5 | 87 | 90 |
| Bromine Compound | | | | | | | | | | | |
| e.g. Nonabromodiphenyl ether | 14 | 10 | 10 | 14 | 10 | 12 | — | — | — | 9 | 5 |
| Dibromopropyl diane | — | — | — | — | — | — | 8 | 3.5 | — | — | — |
| Decabromodiphenyl ether | — | — | — | — | — | — | — | 2 | — | — | — |
| $Sb_4O_5Cl_2$ | — | — | — | — | 8 | — | — | 6 | — | — | — |
| $Sb_4O_5Br_2$ | — | 8 | — | — | — | — | — | — | 2.5 | — | 5 |
| $Sb_4O_5SO_4$ | — | — | 8 | — | — | — | — | — | — | 4 | — |
| $Sb_2O_3$ | 5 | — | — | 5 | — | 4 | — | 2 | — | — | — |
| (All Data in % by Weight) | | | | | | | | | | | |
| Flammability Characteristics | | | | | | | | | | | |
| LOI % | 24 | 25 | 24 | 24 | 25 | 26 | 27 | — | — | — | — |
| DIN 4102 | B-1 | B-1 | B-1 | — | — | — | — | B-1 | B-1 | B-1 | B-1 |
| UL 94 | V-0 | V-0 | V-0 | V-0 | V-0 | V-0 | V-0 | V-2 | V-2 | V-2 | V-2 |
| Physical Properties | | | | | | | | | | | |
| Tensile Strength N/mm$^2$ | 25.2 | 21.2 | 20.0 | 40 | 40 | 89 | 90 | 25 | 25 | 15 | 15 |
| Impact Strength KJ/m$^2$ | 45 | 45 | 43 | 10 | 9 | 25 | 25 | 20 | 20 | Not Tested | |
| Heat Distortion Stability °C. | 88 | 86 | 85 | 90 | 90 | 160 | 160 | 75 | 76 | — | — |
| Electric Conductivity | 10$^{14}$ | 10$^{14}$ | 10$^{14}$ | | | | | | | | |

TABLE 2

| PVC (F) | | | |
|---|---|---|---|
| Dioctyl phthalate | Parts by Weight | 28 | 28 |
| Stabilizer | " | 1 | 1 |
| Dye | " | 5 | 5 |
| $Sb_4O_5Br_2$ | " | — | 8 |
| $Sb_2O_3$ | " | 12 | — |
| Suspension PVC | " | 60 | 60 |
| Flammability Characteristic According to DIN 22 118 | | | |
| Intact residual length | mm | 30 | 40 |
| LOI | % | 31 | 31.75 |
| Rubber (G) | | | |
| Carbon black | Parts by Weight | 55 | 55 |
| Vulcanizing agent | " | 2 | 2 |
| Age retarder | " | 0.5 | 0.5 |
| Zinc oxide | " | 5 | 5 |
| Sulfur | " | 2.5 | 2.5 |
| CR Elastomer | " | 100 | 100 |
| Pentabromodiphenyl ether | " | 8 | 12 |
| $Sb_4O_5Br_2$ | " | 10 | 10 |
| $Sb_2O_3$ | " | — | 8 |
| LOI | % | 38 | 38 |

TABLE 3

| UP Resin (H) | | | |
|---|---|---|---|
| Kaolin | Parts by Weight | 20 | 20 |
| Talc | " | 10 | 10 |
| Co Naphthenate | " | 0.3 | 0.3 |
| $Sb_2O_3$ | " | 7 | — |
| $Sb_4O_5Br_2$ | " | — | 6 |
| Peroxide | " | 2.5 | 2.5 |
| UP Resin with | " | 70 | 70 |

TABLE 3-continued

| 26% Cl on "Het" acid base Flammability Characteristic | | | |
|---|---|---|---|
| Afterglow | sec | 1 | 1 |
| Intact residual length | mm | 289 | 290 |
| LOI | % | 34 | 34 |
| PUR Foam (I) | | | |
| Polyol | Parts by Weight | 39.8 | |
| Stabilizer | " | 0.06 | |
| Blowing agent | " | 15.9 | |
| Trichloroethyl phosphate | " | 20 | |
| $Sb_4O_5Br_2$ | " | 6 | |
| Isocyanate | " | 46 | |
| Flammability Characteristic | | | |
| According to DIN 4102 | | B-2 | |
| According to ASTM | sec | 10 | |
|  | mm | 5 | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a flameproofed polymeric composition comprising a thermoplastic synthetic resin, a thermosetting synthetic resin, or an elastomer and a halogen-containing flameproofing component and an antimony-containing flameproofing component the improvement wherein the antimony-containing flameproofing component is $Sb_4O_5SO_4$.

2. A composition of claim 1 wherein the amount of antimony-containing compound is 1–20% by weight based on the total weight of the composition.

3. A composition of claim 1 wherein the amount of antimony-containing compound is 5–10% by weight based on the total weight of the composition.

4. A composition of claim 1 wherein the amount of halogen-containing flameproofing component is 5–12% by weight based on the total weight of the composition.

* * * * *